J. SNOW.
EVAPORATOR.
APPLICATION FILED FEB. 26, 1915.

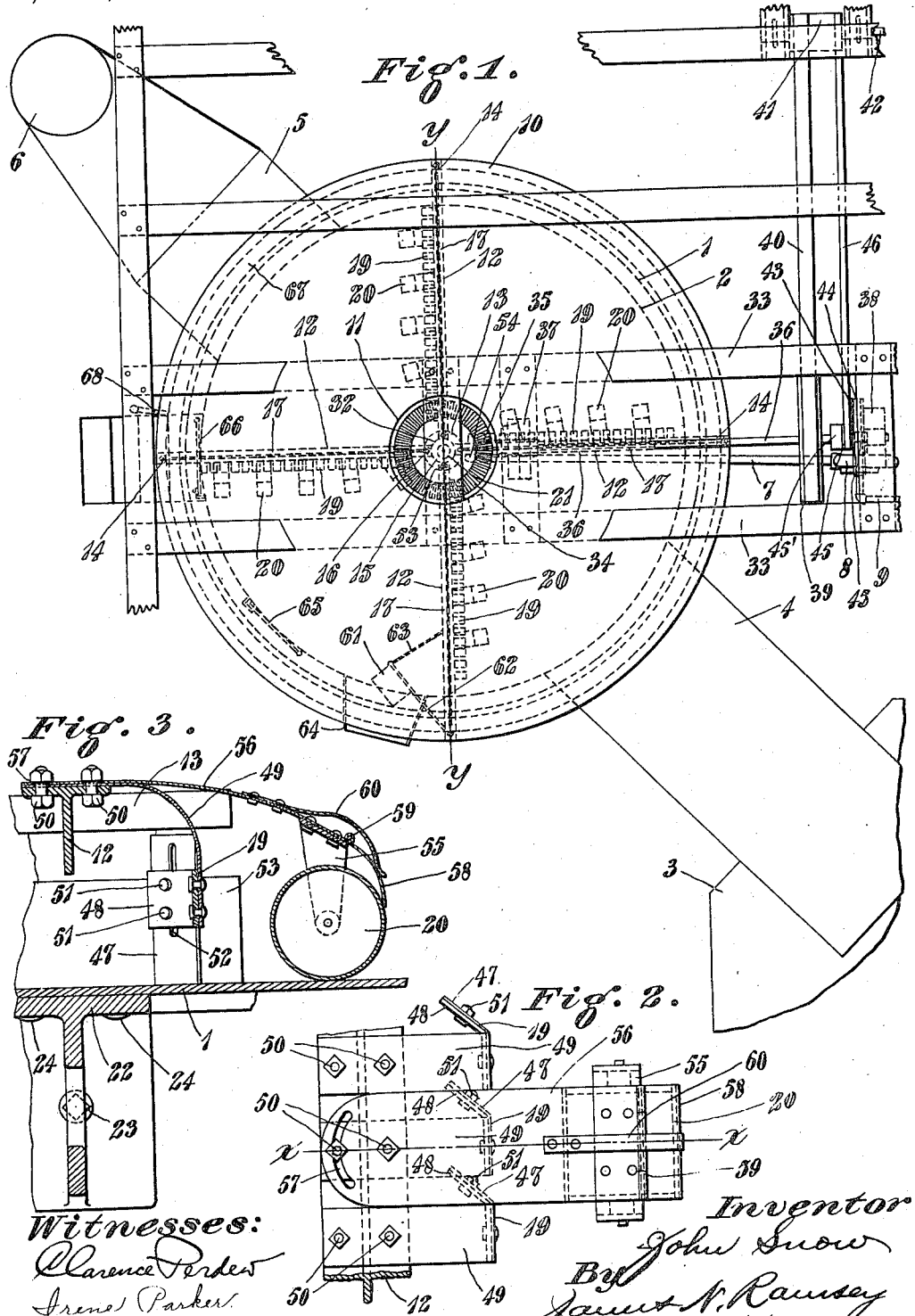

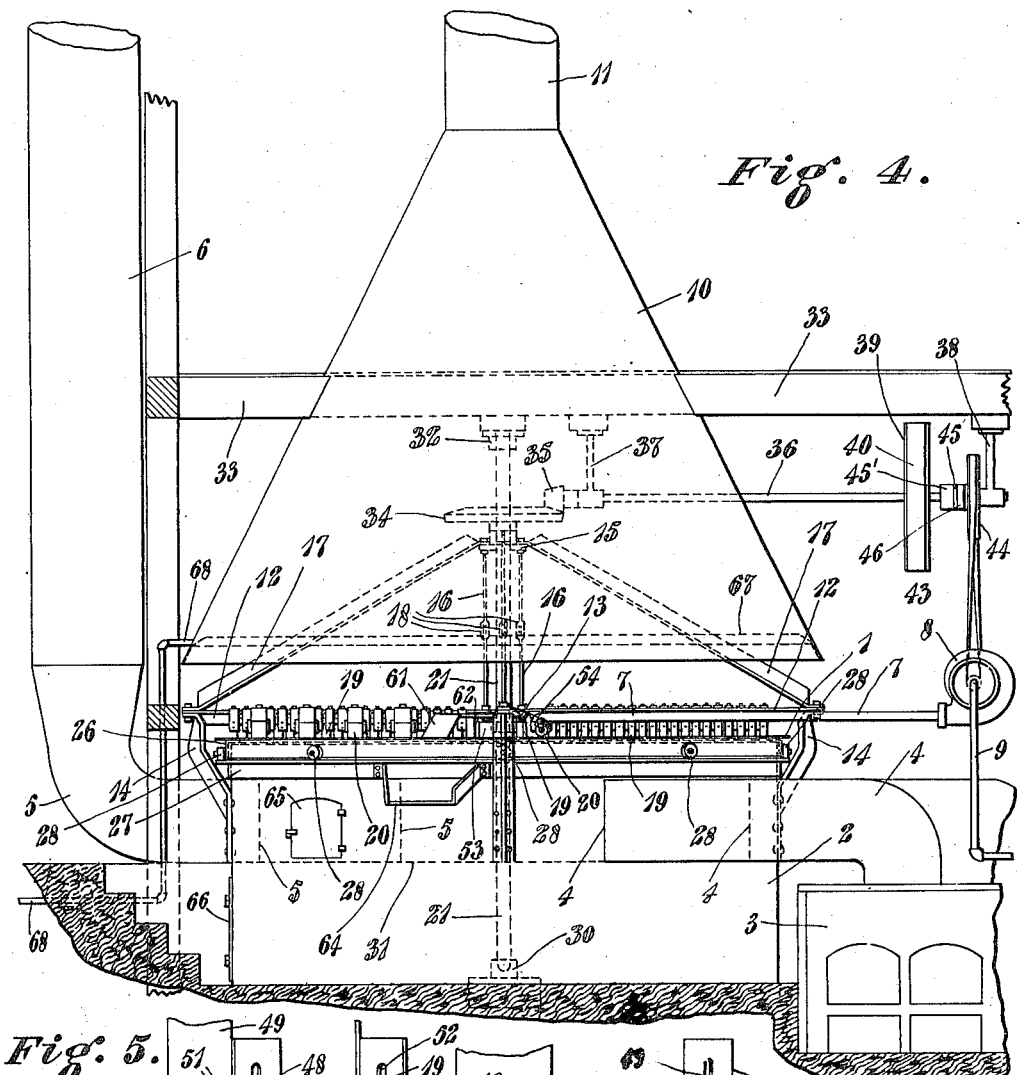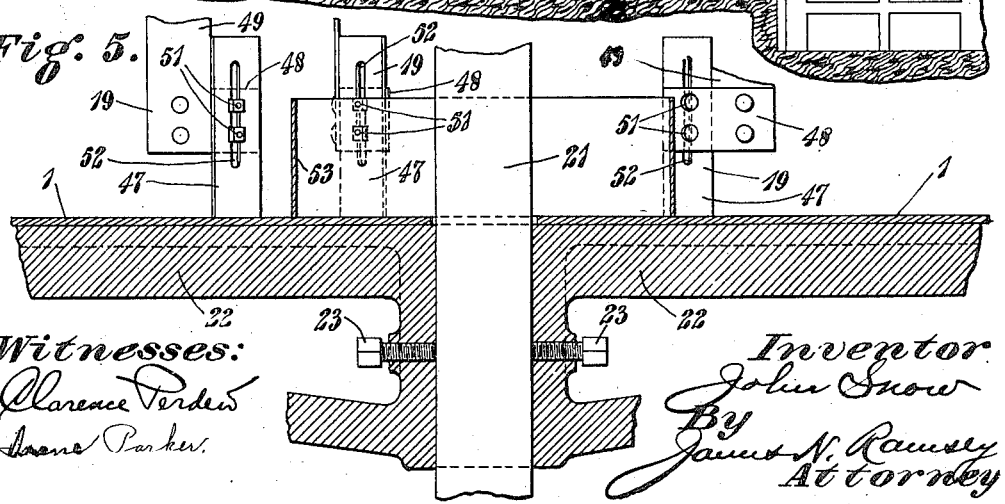

1,168,573.

Patented Jan. 18, 1916.
3 SHEETS—SHEET 3.

Witnesses:
Clarence Verden
Irene Parker.

Inventor
John Snow
By James N. Ramsey
Attorney

UNITED STATES PATENT OFFICE.

JOHN SNOW, OF CINCINNATI, OHIO.

EVAPORATOR.

1,168,573.   Specification of Letters Patent.   Patented Jan. 18, 1916.

Application filed February 26, 1915. Serial No. 10,767.

*To all whom it may concern:*

Be it known that I, JOHN SNOW, a citizen of the United States, and a resident of Cincinnati, in the county of Hamilton and State of Ohio, have invented certain new and useful Improvements in Evaporators, of which the following is a specification.

My invention relates to driers; and its object is to reduce the moisture contained in distillery slops or other by-products of treatment of farinaceous or other food stuffs, which, during the treatment, have been mixed with water or other liquids to a substantially liquid consistency.

The especial object is to sufficiently reduce the moisture content of such substances to render them fit for stock feed; and to thus act upon the substances without scorching or burning them, and to enable a continuous evaporating operation to be carried on, accompanied with continuous delivery to the apparatus of the substance to be treated, and continuous delivery from the apparatus of the substance in its condition with the desired amount of moisture. My apparatus may, by proper regulation, also be used as a drier to remove all of the moisture from such substances. However, where the substances are to be used as stock feed, it is highly desirable that they contain a considerable amount of moisture when fed to the stock; although such amount of moisture as these substances usually contain renders them unfit for feeding to stock. In most communities, laws have been enacted forbidding the feeding of slops and similar substances to stock with such high proportion of moisture as they usually contain at the completion of the processes of which they are by-products.

My invention consists in the parts and in the details of construction and arrangement of parts as will hereinafter be more fully described and claimed.

Figure 6:
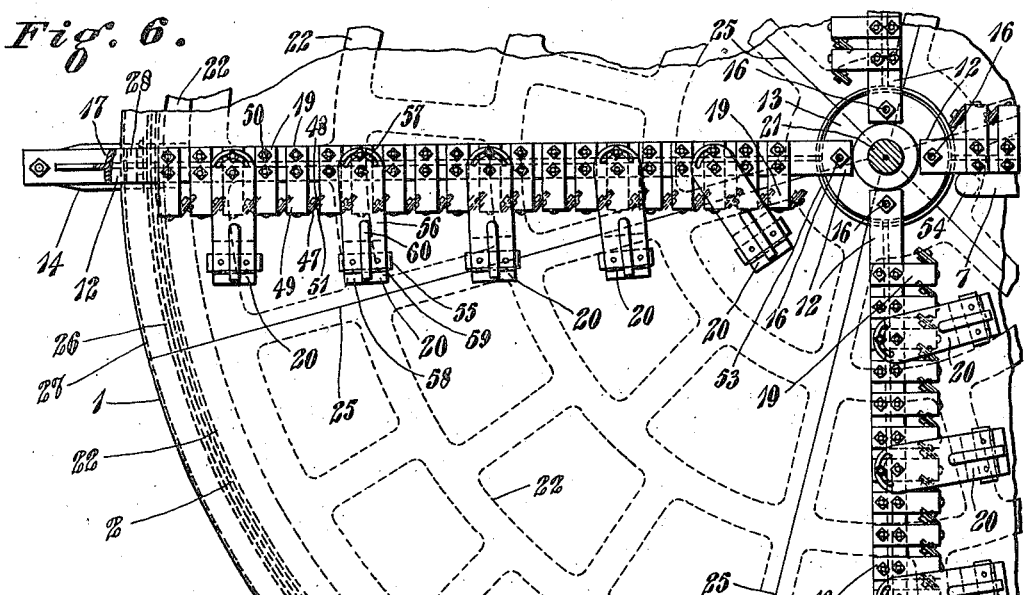
Figure 7:
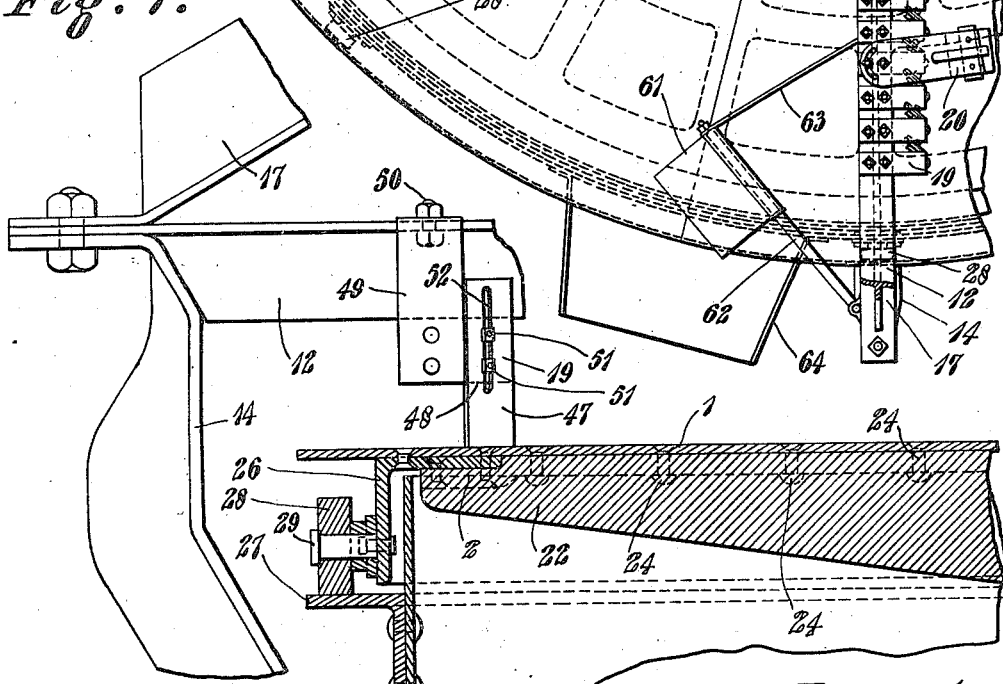

In the drawings: Figure 1 is a general plan view of apparatus embodying my invention; Fig. 2 is an enlarged detail plan view of some of the scrapers and their mounting and one of the crushing rollers and its mounting; Fig. 3 is a section on a line corresponding to the line $x—x$ of Fig. 2; Fig. 4 is a side elevation of the apparatus on a scale corresponding to that of Fig. 1; Fig. 5 is a vertical cross section on a line corresponding to the line $y—y$ of Fig. 1, showing the central mounting of the disk; Fig. 6 is a partial plan view of the disk and associated parts on a scale enlarged from that of Figs. 1 and 4, but reduced from that of the other preceding figures; and Fig. 7 is a further section on a line corresponding to the line $y—y$ of Fig. 1, illustrating the peripheral mounting of the disk, and also showing adjacent parts of the scraper and roller frame.

My invention involves the spreading of the substance on a flat surface of a plate, which plate is heated, preferably by direct contact of the products of combustion, and causing a movement of the particles of substance across the surface to prevent their scorching and sticking to said surface.

As I prefer to embody my invention, the plate 1 is in the form of a disk which lies over the upper end of a short cylindrical shell 2. A suitable furnace 3 has a flue 4 leading up from its top and horizontally into one side of the shell 2, while from the opposite side of the shell a flue 5 leads horizontally outward and upward into a stack 6. The slop or other substance, which is in a substantially liquid form, is delivered through a pipe 7 to the upper surface of the disk 1 by means of a suitable pump 8 receiving the substance through an inlet pipe 9 which leads from the receptacle in the distillery or other place into which the slop or other substance has been delivered as a by-product from the principal manufacturing operation. Over the disk or plate 1 is a conical hood 10 from the top of which leads a stack 11 to conduct away the vapor rising from the substance on the plate or disk 1 as it is heated by the passage of the smoke and flame and other products of combustion from the furnace 3 into the interior of the shell 2 under the plate or disk 1 and out through the flue 5 and stack 6.

Mounted across the top of the disk 1 is the scraper and roller frame, which, as here shown, comprises four horizontal bars 12 rigidly fixed to a central hub 13 and radiating therefrom, 90° apart, to standards 14 which are fixed to the outer sides of the shell 2 and extend up past the periphery of the disk 1, said bars 12 being rigidly fixed to these standards 14. To give this frame a trussed construction, an upper hub 15, similar to the hub 13, is connected to the upper ends of vertical tension members 16 which have their lower ends fixed in the hub 13, and four braces 17 are fixed to the upper hub 15 and extend radially outward and downward to the outer ends of the bars 12, being here rigidly fixed to said bars and the standards 14. The tension members 16 may have turn buckles 18 for adjusting their length to give the proper tightness and rigidity to the entire trussed structure thus made up. Mounted at suitable intervals along the bars 12, and bearing on the upper surface of the disk 1, are the scrapers 19 and the crushing rollers 20, the detailed construction of which will be described later.

Extending vertically through the hubs 13 and 15, and centrally of the disk 1, is the main shaft 21 which supports the disk 1 by means of a spider 22 suitably fixed on said shaft 21, as by set screws 23 in Fig. 5, with the disk 1 suitably fixed to said spider, as by means of the rivets 24. The disk 1 may be made up of a convenient number of segments which meet in accurately fitted seams 25 as shown in Fig. 6. The spider may be in the form of a number of concentric rings joined by suitably distributed spokes as indicated by the dotted lines in Fig. 6. It will be understood that the disk may be riveted at suitable intervals along these rings and spokes. For the treatment of most slops and similar substances it is required that the disk 1 be of copper or brass, while the spider 22 may be of cast iron.

Outside the shell a ring or flange 26 of angular cross section has its horizontal leg riveted or otherwise rigidly attached to the lower side of the disk 1 and extending in over the shell rim, with its vertical leg in close to the outer side of the shell 2. The disk 1 is so mounted that the lower side of the horizontal leg of the flange 26 is very close to the upper edge of the shell rim. By this arrangement thus described, the vertical leg of the ring 26 lapping a considerable distance down outside the shell prevents escape of any material amount of the products of combustion through the slight space above the shell rim. Another ring or ledge 27 of angular cross section is fixed to the outside of the shell 2 with its horizontal leg slightly below the lower edge of the vertical leg of the ring 26, and with its vertical leg extending down and riveted or otherwise rigidly fixed to the shell 2. Rollers 28 are journaled horizontally on studs 29 that are rigidly fixed to and extend outward from the vertical leg of the ring 26, these rollers running around on the upper surface of the horizontal leg of the ledge 27, and thus supporting and steadying the periphery of the disk 1 and enabling its flange 26 to have the comparatively slight clearance with the upper edge of the shell 2 before mentioned without coming into engagement therewith, which engagement should it occur, would add greatly to the resistance of turning the disk, since in practice the disk 1 is made about twelve feet in diameter.

The lower end of the main shaft 21 has a step bearing 30. In order to remove this bearing sufficiently far from the hot products of combustion inside the shell 2 under the disk 1, the shell 2 is extended down into a pit, in the bottom of which the step bearing 30 is suitably rigidly mounted, and substantially level with the ground line the shell 2 has a diaphragm 31 down through which the shaft 21 extends to its bearing 30; this diaphragm 31 thus forming the bottom of the space which the products of combustion enter, and leaving below it an ample air space around the lower end of the shaft and its bearing. The furnace 3, which may be of any approved design, may be located in the pit alongside the apparatus as indicated in Fig. 4, and the flues 4 and 5 may thus rest substantially on the ground or floor of the building where they extend into and out of the shell 2. The upper part of the shaft 21 extends a considerable distance above the hub 15 and has a bearing 32 for its upper end which, as here shown, is suitably fixed to the joists 33 of the building. These joists extend through and support the hood 10 and its stack 11.

Fixed on the shaft 21 above the hub 15 is a bevel gear 34 in mesh with which is a bevel pinion 35 fixed on a horizontal shaft 36. This shaft 36 extends out through the side of the hood 10 and is journaled in hangers 37 and 38 inside and outside of the hood, respectively. Near the outside hanger 38 the shaft 36 has a suitable pulley 39 with a belt 40 passing around it and around a suitable pulley 41 on the line shaft 42. As here shown the pump 8 is of the rotary or centrifugal type, and is driven by a belt 43 from a pulley 44 turning with a smaller pulley 45 loosely on the end of the shaft 36 next to the outer hanger 38, which in turn is driven by a belt 46 also passing around the pulley 41 on the line shaft 42. A loose pulley 45' allows the pump to be started and stopped independently of the starting and stopping of the disk 1.

Each scraper 19 comprises a scraper blade 47 which consists of a rectangular thin plate standing substantially vertical with its lower end making contact with the upper surface of the disk 1 and with its lower end or edge extending across the surface of the disk at an angle to the local arc of circle of rotation of the disk of 45° or 50°, as is best seen in Fig. 6. This blade 47 is fixed to a bracket 48 composed of a plate bent to have two members, one of which bears flatly against the back of the blade 47 some distance above the upper surface of the plate 1 and the other of which extends substantially parallel with the bar 12 and is riveted or otherwise suitably fixed to the lower upright end part of the scraper spring 49, which curves upward and backward, with an upper horizontal end part lying flat upon the top of the bar 12 and fixed by means of bolts 50 to said bar. As here shown, the bar 12 is of T-shaped cross section with the stem extending downward, leaving the flat top for the attachment of the springs 49 as above described. The mounting of the blade 47 on the bracket 48 is preferably by means of two bolts 51 extending through a vertical slot 52 in the blade 47, thereby enabling up-and-down adjustment of the blade 47 to be made. These scrapers 19, thus made up and mounted on the bar 12, are spaced along the respective bars 12 in such a manner that the blades 47 of the scrapers mounted on each bar materially overlap the paths of respective scrapers of the adjacent bars as these paths are described by the scrapers on the upper surface of the disk 1 by its rotation with the bars 12 and their scrapers 19 held stationary.

The part of the disk 1 around the shaft 21 at the center, which moves very slowly has a collar 53 extending up around it, and the feed pipe 7 has its outlet 54 outside and very close to this collar. As before stated, the slop or other substance delivered through this feed pipe is of substantially liquid consistency, and when it is discharged onto the central part of the disk 1 it flows out and distributes itself across the surface of the disk; being kept off of the slow moving part of the disk; and as soon as it is thus distributed over the hot disk, the moisture will begin to evaporate therefrom and pass up through the hood 10. The scraper blade 47 nearest to the collar 53 will, as soon as particles of the substance engage with it, scrape them radially outward along the disk, in which radial position they will remain until they reach the scraper blade 47 on the next bar 12 around the apparatus, whereupon this blade will move them still farther radially outward. This intermittent radially outward movement will continue as the particles engage with the successive scraper blades 47 around the apparatus and along the bars 12, until the particles will, finally, by the action of the most outwardly located scraper blade 47, be brought very close to the periphery of the disk, from which they are to be delivered in the desired condition.

Most such substances treated contain a considerable amount of gluten or analogous albuminous or sticky substance which coagulates upon heating and tends to agglomerate. Due to such tendency, such substances when heated upon the disk 1 will, long before reaching the periphery of the disk, have formed into relatively large masses or lumps, in which condition evaporation of the moisture is considerably hindered and liability of burning or scorching the substances is increased. To crush these lumps and maintain the substance in a finely divided condition is the purpose of the crushing rollers 20. Each of these rollers 20 is journaled in a yoke 55 mounted on the outer or free end of a resilient flat roller spring 56, which has its other end fixed to the top of the bar 12 over one of the scraper springs 49 by means of the same bolts 50 that attach the scraper springs 49 to said bar 12. The aperture 57 in the roller spring 56 through which one of the bolts 50 extends may be elongated in the form of an arc concentric with the other bolt 50, permitting the entire mounting of the roller 20 to be swung around to bring the axis of the roller approximately on the radius of the disk 1 where the roller happens to be located. Each roller 20 is provided with a roller-scraper 58, connected by means of a hinge 59 with the end of the roller spring 56 adjacent to the yoke 55, and bearing on the convex surface of the roller 20 throughout its length, a little over half-way up its side away from the bar 12. This roller-scraper is held down by a spring 60, fixed to the roller spring 56 above the yoke 55 and bowed outward and downward with its free end in contact with the outer side of the roller-scraper 58. These rollers 20, thus mounted on the bar 12, are spaced along the respective bars 12 in such a manner that the rollers mounted on each bar materially overlap the paths of the respective rollers of the adjacent bars as these paths are described by the rollers on the upper surface of the disk 1 by its rotation, with the bars 12 and said rollers 20 held stationary. By this arrangement, every part of the surface of the disk is covered at some part of its revolution by one of the rollers, so that any certain mass or lump of the substance will come under the action of a roller 20 once during each revolution of the disk 20. If the substance sticks to the convex surface of the roller 20 it will be scraped off by the roller-scraper 58, and will fall back upon the disk 1. This operation maintains the substance in a properly finely divided condition, so that it will have had evaporated out of it the proper proportion of moisture when it reaches the periphery of the disk 1.

When the radially outermost scraper 19 has acted upon the substance, pushing it near to the periphery of the disk, it will then be acted upon by a fender 61 composed of a flat rectangular sheet inclined downward and outward with its lower edge resting upon the upper surface of the disk 1 adjacent to the periphery thereof, and extending out past the periphery, and with its upper part pivoted on a substantially horizontal rod 62 that extends in from one of the standards 14 to which said rod is fixed. The inner end of the rod preferably has a brace 63 attached to the adjacent bar 12. Thus supported, the fender 61 is held with its edge at a low angle to the periphery of the disk, so that the substance that reaches the peripheral part of the disk is scraped off into a chute 64 mounted on the shell 2 below the fender 61. This chute may discharge into any suitable receptacle, which it is not necessary to show herein.

The shell 2 may have a door or manhole 65 in its side through which entrance may be had to the interior of the shell above and below the diaphragm 31 for removing soot or other accumulations from the interior of the shell, and particularly from the lower surface of the disk 1. Another door or manhole 66 gives access to the space below the diaphragm, for attending to the lower bearing 30 of the shaft 21.

The hood 10 may be provided with an inwardly upwardly extending flange 67 on its interior wall near its bottom to catch moisture condensing on the inner walls of the hood and running down thereon. The discharge pipe 68 may lead from the side of the hood immediately above this flange 67 to carry away the moisture thus intercepted by the flange. The hood 10 may be supported by the joists 33 running through it, and to which said hood is closely fitted.

While, for the purposes of illustrating my invention, I have shown and specifically described a certain example of an embodiment thereof, I do not wish to be understood as being limited to the precise illustration and description, but

What I claim as new and desire to secure by Letters Patent is:

1. In an evaporator or drier, a substantially circular disk or plate having a substantially flat horizontal surface, a vertical shaft fixed to said plate centrally of and extending above and below the plate, heating means below the plate around said shaft, means for rotating said shaft and plate, means for feeding substance onto said surface of the plate near its center, stationary scrapers mounted at various radial distances from said shaft and engaging the substance on the plate with edges inclined to the direction of circular travel of the substance as carried around by the plate, whereby the substance is fed from the central part of the plate toward the periphery of the plate, and crushing rollers mounted at various radial distances from said shaft to coöperate with said plate and crush the substance on the plate.

2. In an evaporator or drier, a substantially circular disk or plate having a substantially flat horizontal surface, a vertical shaft fixed to said plate centrally of and extending above and below the plate, heating means below the plate around said shaft, means for rotating said shaft and plate, means for feeding substance onto said surface of the plate near its center, a stationary bar mounted above said flat surface of the plate and extending from near said shaft out toward the periphery of the plate, and scrapers mounted at intervals along said bar and engaging with the substance on said surface of the plate with edges inclined to the direction of circular travel of the substance as carried around by the plate, to feed said substance from the central part of the plate out toward the periphery of the plate and crushing rollers mounted on said bar at intervals therealong, to coöperate with said plate and crush the substance on said surface.

3. In an evaporator or drier, a substantially circular disk or plate having a substantially flat horizontal surface, a vertical shaft fixed to said plate centrally of and extending above and below the plate, heating means below the plate around said shaft, means for rotating said shaft and plate, means for feeding substance onto said surface of the plate near its center, a stationary hub around said shaft near said flat surface of the plate, another stationary hub around said shaft and spaced upwardly from the first mentioned hub, a plurality of bars fixed to the first mentioned hub and extending along above the flat surface of the plate out past the periphery of the plate, stationary means supporting said bars past said periphery, and braces extending from the parts of the bars past the periphery upward and inward to the collar that is spaced upward on the shaft, and fixed to said collar, and a tension member from the upper collar to the first mentioned collar, whereby said first mentioned collar is supported by the upper collar through said braces from the means that supports said bars and braces past the periphery of the plate, and feeding means mounted on said bars and engaging with the substance on the flat surface of the plate to feed the substance along said surface.

4. In an evaporator or drier, a substantially circular disk or plate having a substantially flat horizontal surface, a vertical shaft fixed to said plate centrally of and extending above and below the plate, heating means below the plate around said shaft, means for rotating said shaft and plate, means for feeding substance onto said surface of the plate near its center, stationary feeding means engaging with the substance on the surface of the plate, and trussed supporting means for the stationary feeding means.

5. In an evaporator or drier, a substantially circular plate or disk, a substantially 13. In an evaporator or drier, comprising a movable plate, means for heating the plate, means for feeding substance onto the plate, and means for feeding the substance across the surface of the plate, a means for crushing the substance on said surface comprising a roller, a stationary mounting, and yieldable connection between the roller and the stationary mounting.

14. In an evaporator or drier, comprising a rotatable plate, means for heating the plate, means for feeding substance onto the plate to be treated thereon, and means for feeding the substance across the surface of the plate, means for crushing the substance on said surface comprising a roller, a stationary supporting means, and a mounting for said roller adjustably connected to said stationary supporting means, whereby the roller may be adjusted into a position with its axis approximately radial of said rotatable plate.

JOHN SNOW.

Witnesses:
   JAMES N. RAMSEY,
   CLARENCE PERDEW.